(12) United States Patent  
Caughey (10) Patent No.: US 7,412,487 B2  
(45) Date of Patent: Aug. 12, 2008

(54) METHOD AND SYSTEM FOR TRACKING RECEIPT OF ELECTRONIC MESSAGE

(75) Inventor: David A. Caughey, Ottawa (CA)

(73) Assignee: GoodContacts Research Ltd., Ottawa, Ontario (CA)

( * ) Notice: Subject to any disclaimer, the term of this patent is extended or adjusted under 35 U.S.C. 154(b) by 765 days.

(21) Appl. No.: 10/288,596

(22) Filed: Nov. 6, 2002

(65) Prior Publication Data

US 2004/0088360 A1    May 6, 2004

(51) Int. Cl.
  *G06F 15/16* (2006.01)
(52) U.S. Cl. .................. 709/206; 709/203; 709/217
(58) Field of Classification Search .......... 709/203, 709/206, 217–219
  See application file for complete search history.

(56) References Cited

U.S. PATENT DOCUMENTS

| | | | |
|---|---|---|---|
| 5,937,162 A * | 8/1999 | Funk et al. ............... | 709/206 |
| 6,449,634 B1 * | 9/2002 | Capiel ...................... | 709/206 |
| 6,529,956 B1 * | 3/2003 | Smith et al. ............... | 709/229 |
| 6,701,348 B2 * | 3/2004 | Sommerer ................ | 709/206 |
| 6,769,015 B1 * | 7/2004 | Bates et al. ............... | 709/206 |
| 7,143,140 B2 * | 11/2006 | Dennis ..................... | 709/206 |
| 2001/0052019 A1 * | 12/2001 | Walters et al. ............ | 709/231 |
| 2002/0161775 A1 * | 10/2002 | Lasensky et al. .......... | 707/100 |
| 2004/0006598 A1 * | 1/2004 | Bargagli Damm et al. .. | 709/206 |
| 2004/0186884 A1 * | 9/2004 | Dutordoir ................. | 709/206 |
| 2004/0205133 A1 * | 10/2004 | Adler ....................... | 709/206 |

* cited by examiner

*Primary Examiner*—Lashonda T Jacobs
(74) *Attorney, Agent, or Firm*—Freedman & Associates (57) ABSTRACT

A system and a method for managing electronic contact database are disclosed. A method according to an embodiment comprises the steps of providing a recipient electronic address; providing an electronic mail message; encoding a network address including an indication of a file name and a network file server within the provided electronic mail message, the encoded network address indicative of a unique recipient and indicative of the network file server and a file name from which to retrieve data from the network file server; and, transmitting the electronic mail message to the provided recipient electronic address. A mail server supports the methods for managing electronic contact database.

20 Claims, 6 Drawing Sheets

METHOD AND SYSTEM FOR TRACKING RECEIPT OF ELECTRONIC MESSAGE

FIELD OF THE INVENTION

The present invention relates to the management of electronic contact database, and more specifically to transparently updating the contact database.

BACKGROUND OF THE INVENTION

Every day, the users of the Internet send each other billions of electronic messages (e-mails). An individual may send a dozen or more e-mails each day without even thinking about it. Obviously, e-mail, or electronic mail, has become an extremely popular communication tool. In the past, people have maintained contact lists on paper. The proverbial "black book" is a good example of a list of individuals and their contact information. Unfortunately, the task of maintaining current a large contact list is often too onerous for the few times one needs to contact each individual.

Electronic mail systems, for example, permit users on different computers to communicate with one another by transmitting information such as text messages and the like between the different computers. Electronic mail is often used to permit employees in a company to communicate with other employees connected to the company's internal network, regardless of whether they are in the same building or another company facility. Also, due to the explosive growth of the Internet, electronic mail has now become a relatively common way for anyone with a computer to communicate with other computer users all over the world.

Such tremendous success raises many security issues. Some people perform hacking—trying to violate someone else's computer security for fun, stealing industrial secrets, stealing military secrets, and so forth. Some people develop viruses, worms or other harmful applications for contaminating computer systems and thereby causing damage thereto. Internet and more specifically the electronic mail systems have become a convenient medium through which to receive "infections."

In order to counteract the above-mentioned attacks, a typical commercial private computer network comprises a protection system such as a firewall. There are also personal firewall software packages available. "The perfect personal firewall would be inexpensive and easy to install and use, would offer clearly explained configuration options, would hide all ports to make your PC invisible to scans, would protect your system from all attacks, would track all potential and actual threats, would immediately alert you to serious attacks, and would ensure nothing unauthorized entered or left your PC" (Jeff Sengstack, in *Make Your PC Hacker Proof*, PC World; Jul. 21, 2000). Basically, a firewall is a security process in the form for example of a program or hardware device between an internal network and the Internet for filtering information coming through an Internet connection into a private network of computer systems or into a single computer system, and preventing certain types of transactions from occurring. If someone wants to retrieve a file, a document, or any information from a computer system or a network, a request is sent through the Internet to the computer system or network. The firewall, which is strategically positioned at the Internet connection intercepts the request and blocks or disables it. However, when information is sent from a computer system or the network through the Internet via a known channel such as electronic mail software, the firewall does not intervene. Further, data received from the Internet is allowed to enter the network unfettered so long as it is not deemed a security concern. When a virus protection software application and a firewall application are both up-to-date and in execution, a system should be safe from most security threats.

Therefore, in order to bypass firewall applications to be able to extract information from a computer system or a network, people have started to use those known channels for providing the extracted data. For example, an active email message is provided from the Internet to an electronic mail application in execution on a computer system. The electronic mail message includes a small application for transmitting information from the computer system or the network out to the Internet. Fortunately, existing firewalls disable these messages.

Another method of extracting information involves providing an active email message from the Internet to an electronic mail application in execution on a computer system. In this method the electronic mail message includes only a single instruction in the form of a retrieve file instruction with associated parameters. The parameters are substituted, in part, by the electronic mail program allowing some information about the system to be retrieved. With the common adoption of this probing format, existing firewalls now disable these messages as well.

A service offering automated updating of electronic contact information and ensuring current contact information is offered by GoodContacts® through their World Wide Web site. GoodContacts® addresses the difficult task of enabling people to stay connected to their many circles of contacts. The service provided by GoodContacts® allows for maintaining contacts, updating and management of personal information relating to contacts and provides a dynamic link to all personal and professional relationships. This is performed by providing a method for each user to transmit to other users requests for information updates, thereby allowing for automatic updating of the user contacts within their address book.

When no reply is provided, it is assumed the electronic mail message was delivered to its destination. This, however, may be incorrect. And it would be extremely advantageous to know that an electronic mail message has been delivered, even when not responded to. Unfortunately, any information provided from the recipient computer system back to the sender in an automated fashion is typically filtered by a firewall and, as such, most straightforward methods are inapplicable to typical corporate environments.

In order to overcome such drawbacks of the prior art, it would be advantageous to provide a system that allows this functionality—notification of receipt—without being noticed by a secure firewall application and without violating the security afforded by the firewall.

SUMMARY OF THE INVENTION

In accordance with a preferred embodiment of the present invention, there is provided a method for managing an electronic contact database of a mail server comprising the steps of:

providing a recipient electronic address;

providing an electronic mail message;

encoding a network address including an indication of a file name and a network file server within the provided electronic mail message, the encoded network address indicative of a unique recipient and indicative of the network file server and a file name from which to retrieve data from the network file server; and, transmitting the electronic mail message to the provided recipient electronic address.

In accordance with another preferred embodiment of the present invention, there is provided a method for tracking receipt of electronic messages by a server comprising the steps of:

providing an electronic mail message;

providing data indicative of a server address, the server address for tracking of the electronic mail message;

generating an encoded mail message from the provided electronic mail message and comprising a file name, the filename including encoded data therein;

transmitting the encoded mail message to a destination electronic address.

In accordance with another preferred embodiment of the present invention, there is provided a method for managing an electronic contact database of a mail server comprising the steps of:

receiving from a host computer system a request for downloading data from within a file, the file indicated by a file name;

decoding the file name to determine therefrom recipient data;

storing in association with the recipient data an indication that an electronic mail message transmitted thereto has been accessed; and, sending a data file in accordance with the request to the host computer system.

In accordance with another preferred embodiment of the present invention, there is provided a mail server for managing an electronic contact database comprising:

a memory storage for storing a plurality of electronic addresses stored within the electronic contact database and for storing instruction data for performing the steps of;

providing a recipient electronic address;

providing the electronic mail message;

encoding a network address including the indication of a file name and the network file server within the provided electronic mail message, the encoded network address indicative of a unique recipient and a unique sender of the electronic message and indicative of the network file server and a file name from which to retrieve data from the network file server; and, transmitting the electronic mail message to the provided recipient electronic address; and, an output port in communication with the memory storage, the output port for transmitting the electronic mail message to a plurality of electronic addresses stored within the electronic contact database.

In accordance with another preferred embodiment of the present invention, there is provided a mail server for managing electronic contact database comprising:

an input port for receiving a request from a host computer system, the request for downloading a data file corresponding to a file name;

a memory storage for storing instruction data for performing the steps of:

receiving from a host computer system the request for downloading data from within a file, the file indicated by the file name;

decoding the file name to determine therefrom recipient data;

storing in association with the recipient data an indication that an electronic mail message transmitted thereto has been accessed; and, sending a data file in accordance with the request to the host computer system.

BRIEF DESCRIPTION OF THE DRAWINGS

Exemplary embodiments of the invention will now be described in conjunction with the following drawings, in which.

DETAILED DESCRIPTION OF THE DRAWINGS

Figure 1A:
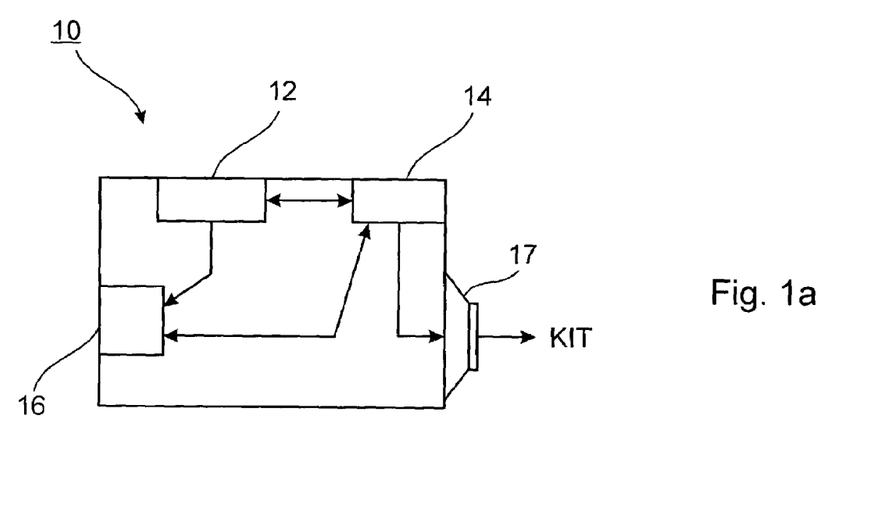
FIG. 1a is a bloc diagram illustration of a system for generating KIT comprising encoded data.

Referring to FIG. 1a, a bloc diagram illustration of a mail server for generating KIT messages comprising encoded data according to a preferred embodiment is shown. The mail server 10 includes email software 12 for generating "Keep In Touch" messages henceforth referred as a KIT messages, the email server is in communication with a contact database 14 in the form for example of an address book containing a plurality of contact address data. The mail server includes a processor 16 for encoding/decoding data included within a generated KIT message. After being generated, the KIT messages are transmitted to an electronic address contained within the contact database through the port 17.

The KIT message is in the form of an electronic mail message containing an image therein. Typically, the image is in the form of a 1×1 pixel transparent image. The transparent 1×1 pixel image is retrieved from a server on the Internet at an address included within the electronic mail message. For example, the image included within the electronic mail message is designated therein as:

http://goodcontacts.com/transparent.GIF

Here the filename for the image is "transparent.gif." Of course, the image could have any filename desired. In this example, the graphics interchange format (GIF) is used because of the properties of such a system and the possibilities that it allows, i.e. providing an efficient method to compress images for online delivery. Of course, any standard image format supported by common electronic mail applications is suitable for use with the invention.

According to the invention, the processor 16 encodes the "filename" within each KIT message uniquely according to data pertinent to tracking the message in the form of the electronic address to which the KIT message is destined. Accordingly, the resulting encoded file name is indicative of the receiving party. For example, if Joe sends his $25^{th}$ set of KIT messages to each of the plurality of electronic addresses contained within his contact list, the path indicated in the 1×1 transparent pixel is in the form for example of: http://goodcontacts.com/image-joe-recipient-25.GIF.

Wherein joe-recipient-25 indicates that Joe is sending a $25^{th}$ KIT message to the recipient. The indication for the individual to whom the KIT is destined is in the form for example of a contact identifier stored in Joe's contact list. Therefore, if an electronic address is associated with the $3^{rd}$ individual, the encoded file name resulting according to this exemplary encoding system is image-joe-3-25.GIF. A similar process is performed for each individual associated with the address data stored within the address book of Joe. As such, each individual receives an electronic mail message having a unique image filename imbedded therein.

Of course, the encoding system is not limited to the system discussed above. All available encoding processes are usable, from a very simple process such as the present exemplary process to more sophisticated encoding process.

Preferably, the image returned upon a request having an encoded filename is identical regardless of the filename and regardless of the electronic address to which the KIT message is sent. What is different is the code attributed to each electronic address thereby allowing for a determination that a particular message was viewed by a recipient. Optionally, the picture is different for different address data.

Optionally, the server traps each encoded filename request based on a known portion of the filename, here "image," and then replies with a same file from the server. Alternatively, upon transmission of the KIT messages, files having the encoded filenames are each created. In either case, access to the image file(s) is tracked and, upon an encoded image filename being received, Joe is notified that the message destined for the recipient thereof has been received. As such, Joe now has four distinctions in KIT message responses—undeliverable, replied to, not replied to not read, and not replied to but read. Of course, when different image files are created, it is preferable to remove them once they are accessed.

As is noteworthy, because the image file request includes only a path and an image filename, a firewall is unlikely to flag it as suspicious. Further, because the information transmitted from the recipient computer system contains only data that was provided thereto within the same electronic mail message, there is no potential for a security breach or security concern caused by the inventive method.

Figure 1B:
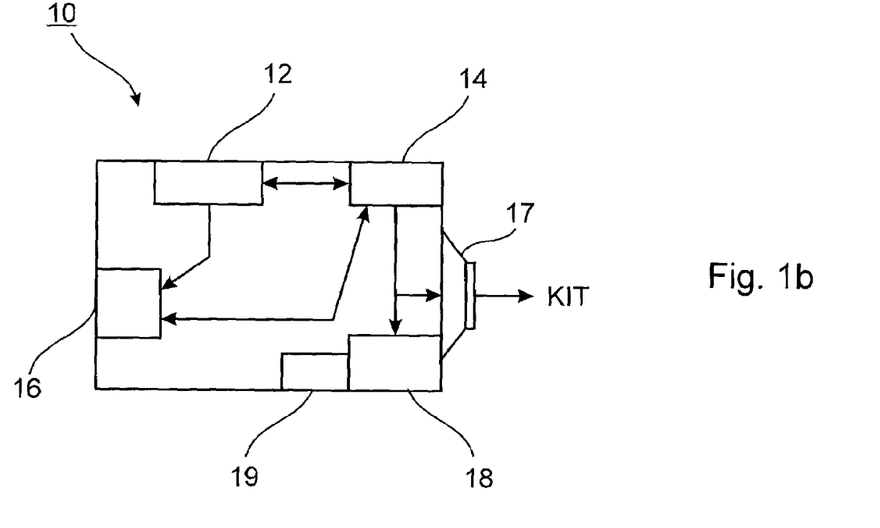
FIG. 1b is a bloc diagram illustration of a system for generating KIT comprising encoded data.

Optionally, as shown in FIG. 1b, the mail server 10 includes a clock 19 for providing a value indicative of the time and or date at which a KIT message was transmitted.

Further optionally, the mail server 10 also includes a memory 18 for storing the list of encoded image file names associated with electronic addresses to which the KIT was sent. Optionally, the value indicative of the time and or date at which the KIT message was transmitted is stored within the memory to avoid another KIT message being sent too soon after a previous KIT message was sent. Of course, the list of encoded file names overwrites an older list of encoded picture file name to which the KIT was sent to prevent to overload the memory.

Optionally, the encoded filenames are not stored. When a known encoding method is employed, decoding of each filename is performable to extract the encoded data therein.

Figure 2A:
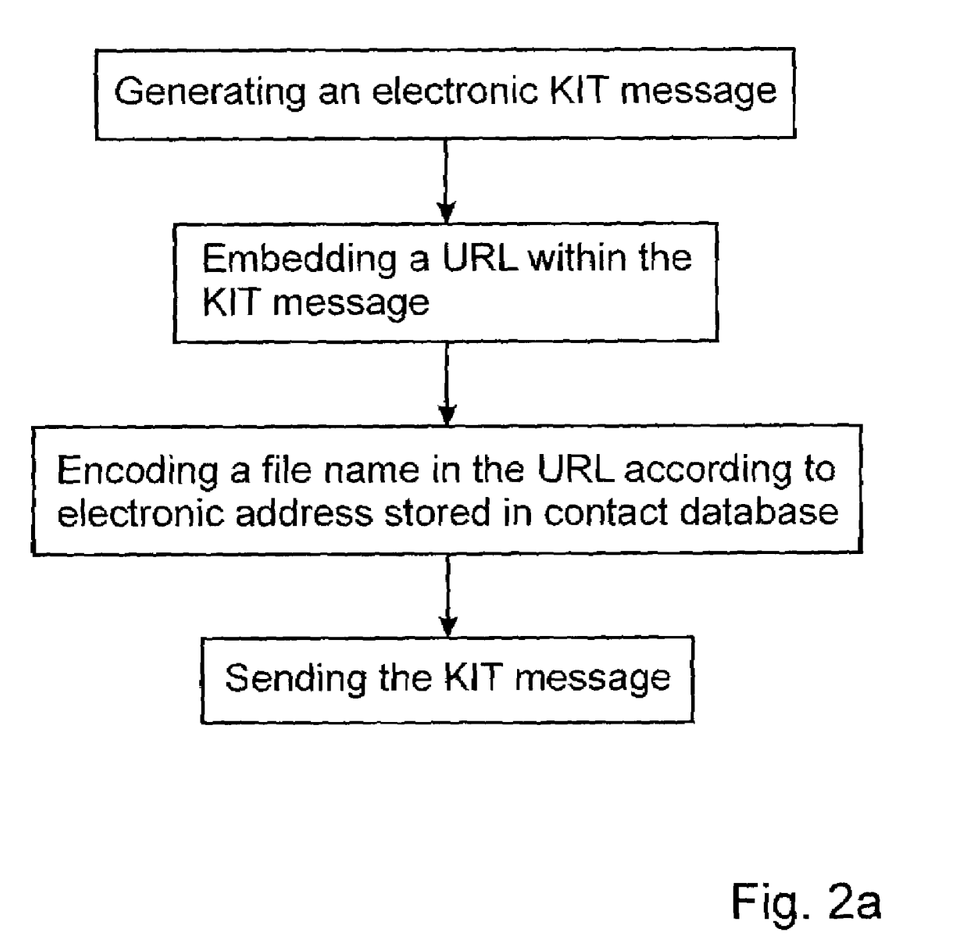
FIG. 2a is a flow chart diagram of a method of generating a Keep In Touch electronic message.

Referring to FIG. 2a, a flow chart diagram of a method of generating a Keep In Touch electronic message is shown. While generating a KIT message, the electronic mail software incorporates within the message a URL, in the form for example of http://goodcontacts.com/filename.GIF. The encoded file name corresponds to an image file having, for example, a GIF extension and a filename having encoded therein data uniquely identifying the kit message. Optionally, the encoding is based on information related to the individual associated with the electronic address of the recipient. Optionally, the encoding includes data decodable only by the sender of the KIT messages. For example, it might contain a transmitter ID number and a KIT identifier number being a sequential number starting at 0 and incrementing with each KIT message generated. In such a method, a database of KIT message identifiers is stored on the senders computer system.

As mentioned above, there are many options for the encoding method used for encoding the file name.

Figure 2B:
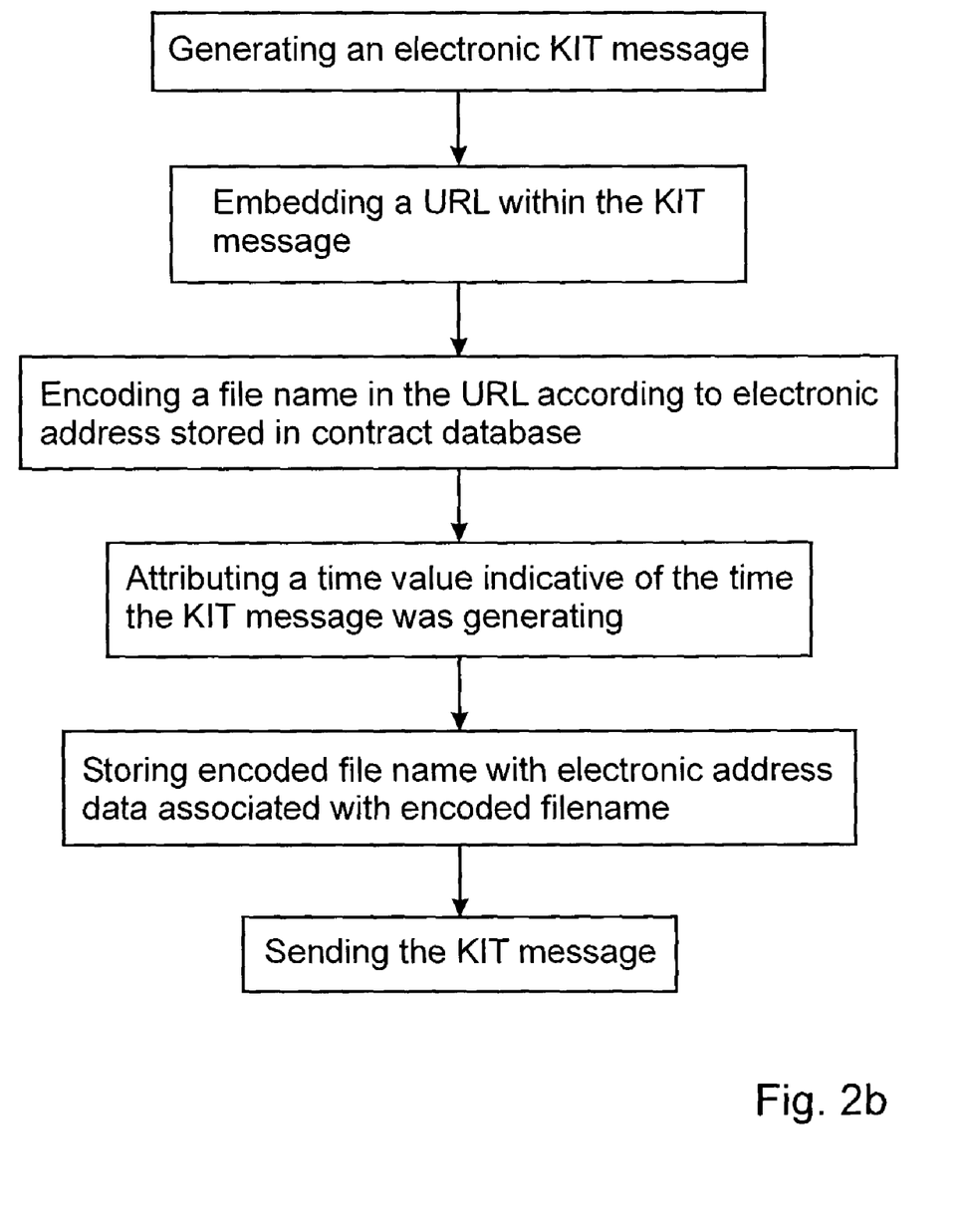
FIG. 2b is a flow chart diagram of a method of generating a Keep In Touch electronic message.

Referring to FIG. 2b, a flow chart diagram of a method of generating a Keep In Touch electronic message is shown. While generating a KIT message, the electronic mail software incorporates within the message a URL, in the form for example of http://goodcontacts.com/filename.GIF. The encoded file name corresponds to an image file having, for example, a GIF extension and a filename having encoded therein data uniquely identifying the KIT message. Optionally, the encoding is based on information related to the individual associated with the electronic address of the recipient. Optionally, the encoding includes data decodable only by the sender of the KIT messages. Further optionally, a value indicative of the time and or the date at which the KIT message was generated is stored along with the encoded file names for further retrieval. The KIT message is then sent to the address data to be contacted. The insertion of a time value allows interception of another KIT message before being sent too soon after a previous KIT message was sent to a same recipient.

Figure 3:
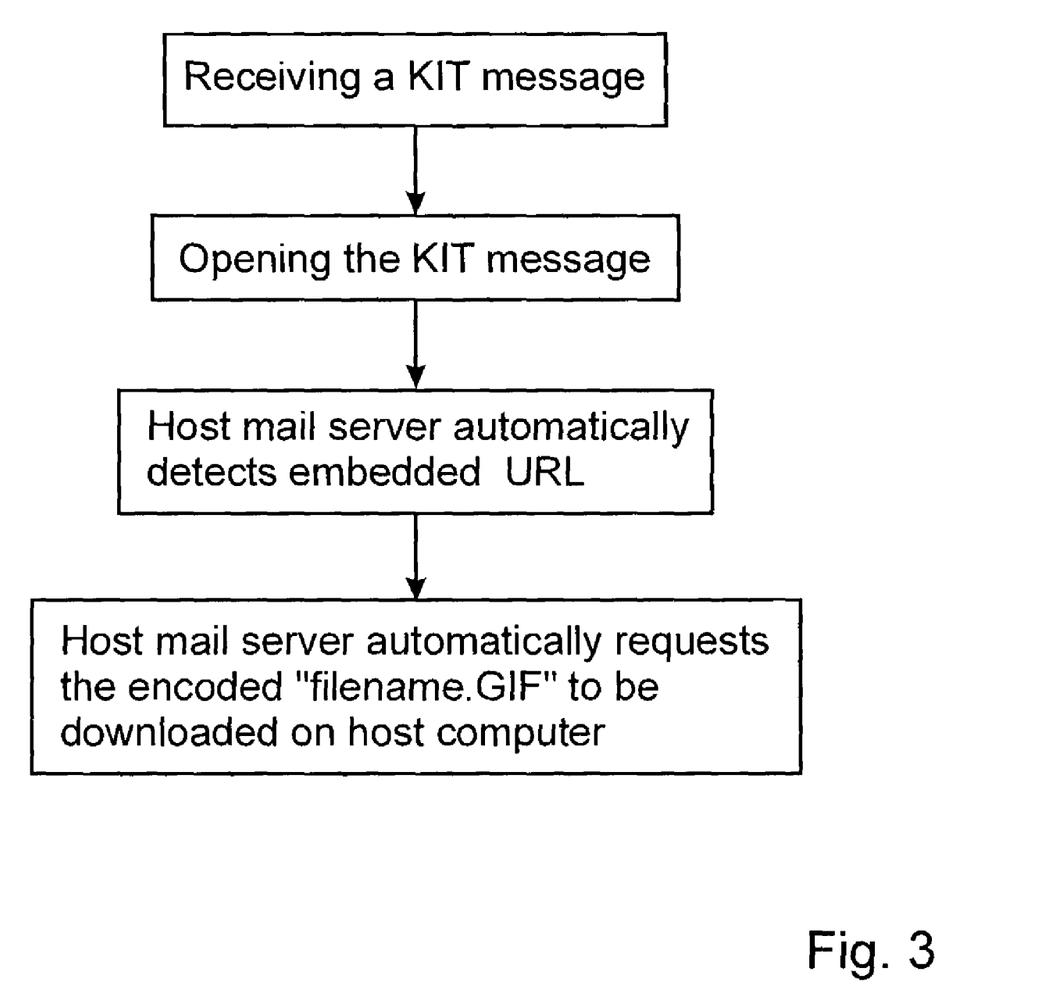
FIG. 3 is a flow chart diagram of a method of receiving the Keep In Touch electronic message on a host computer.

Referring to FIG. 3, a flow chart diagram of a method of receiving the Keep In Touch electronic message generated according to the invention is shown. The KIT message is not differentiated from other electronic mail messages by the mail software of a host computer receiving the KIT message. Upon receipt of any electronic messages including the KIT message, the mail server notifies the user of the host computer that a new electronic mail message was received. The treatment of the KIT message depends on the user, and many options are available.

An option is to open the electronic mail as soon as the user is notified that new electronic mail messages are in the incoming mailbox. Upon opening the electronic message including the KIT, the host electronic mail software automatically detects the embedded URL and automatically sends a request to the server indicated in the URL for downloading the image to the host computer.

Advantageously, there is no security violation of a firewall because the host computer never sends out a file or other data that potentially belonged only on the host computer. Furthermore, the firewall allows the request for downloading the image to be transmitted therethrough because from the URL it is recognized that an image is to be downloaded. Therefore, a risk of downloading an application, which when downloaded is able to automatically run and attack the host computer is mitigated.

Another option when the message is received is that the user does not open the message, which therefore remains in the incoming mailbox for as long as the user chooses to leave it there. If after a certain period of time the user opens the message, the mail server is requested to download the image as previously described. Alternatively, if the mail message is never viewed by the user, the KIT status will remain at delivered but unopened. In such a situation, the server indicated by the URL is never contacted by the recipient to download the image therefrom.

Of course, it is also possible that a recipient receives an email message including a KIT on several different computers and thereby either views or fails to view them on each computer independently. Thus, a same image file request having a same filename may be transmitted to the server indicated by the URL many times. Optionally, only one such request is provided to the user. Alternatively, each and every file request is processed and the user is informed thereof.

Figure 4:
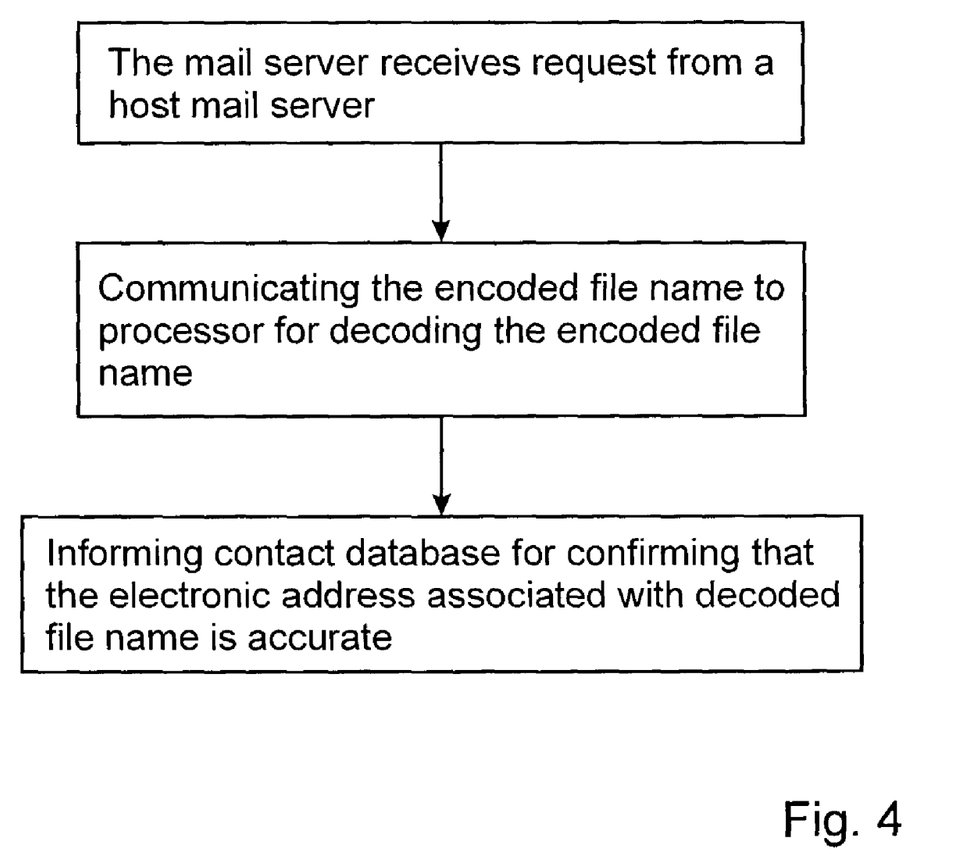
FIG. 4 is a flow chart diagram of a method of managing a database upon receiving the request; and, FIG. 5 is a flow chart diagram of a method of reacting when the KIT message bounces.

Referring to FIG. 4, a flow chart diagram of a method of managing a database upon receiving a request is shown.

When the server indicated by the URL receives a request from mail software of a host computer to download the image associated with the encoded file name, the processor is contacted and the encoded file name is decoded. The contact database is provided with the decoded file name such that an electronic address is associated with the file name, and an image—either predetermined or otherwise—is provided in response to the received request. This results in confirming the validity of the address data.

Optionally, when an electronic address is found valid, the encoded file name associated with the electronic address is removed from the memory, such that only unconfirmed encoded file names remain within the list. However, after a certain period of time, when no bounced KIT message has been received from an electronic address associated with an encoded file name, it is probable that the electronic address is valid but the recipient party has decided to either not read the message or to delete the message; the message is considered as received. When such is the case, the address data is optionally identified as associated with a non-responding individual.

Figure 5:
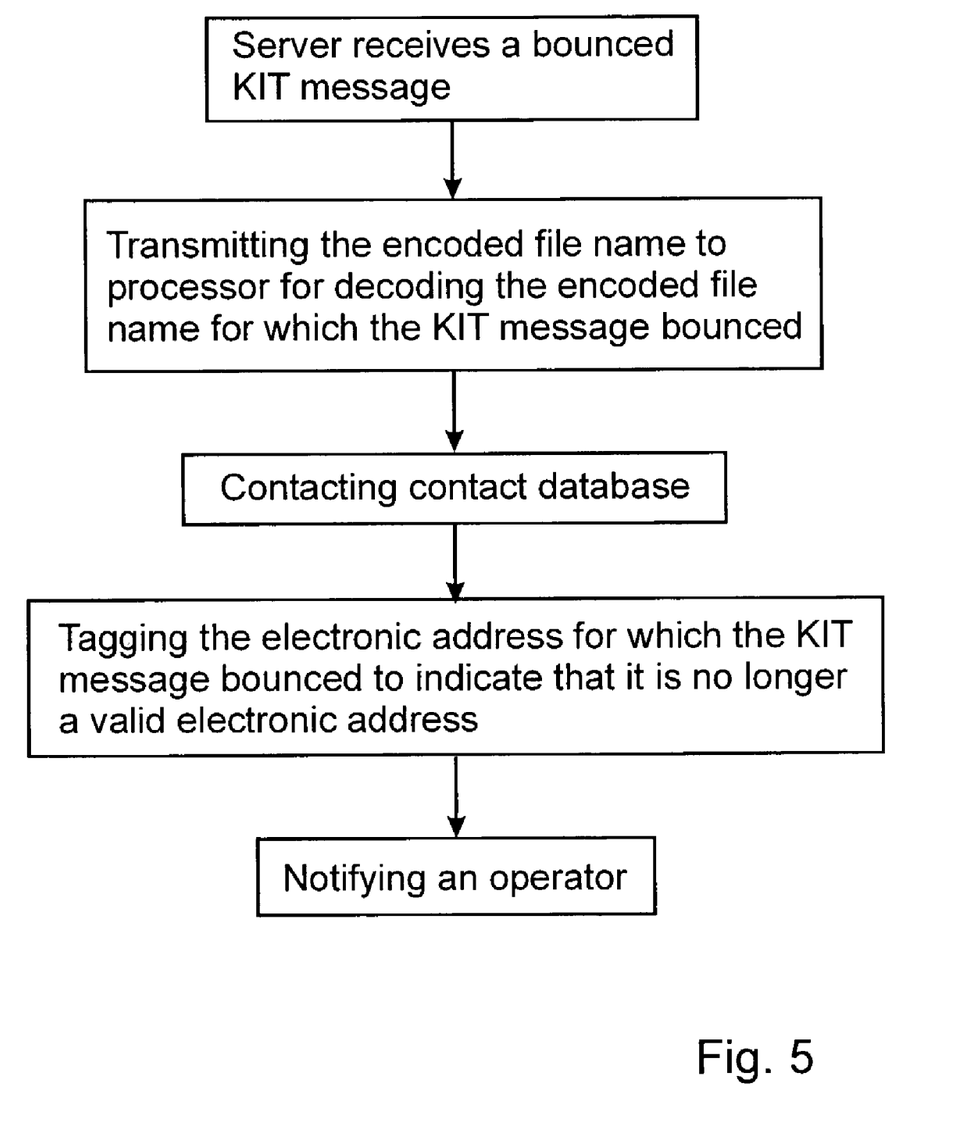

Referring to FIG. 5, a flow chart diagram of a method of reacting when the KIT message bounces is shown. When an electronic mail server generates a KIT message according to the invention and sends the KIT message to the individuals, whose electronic address are stored within the contact database, a possibility exists that an address datum is no longer valid. When this is the case, the KIT message sent to this electronic address bounces. Upon receiving a bounced KIT message, the electronic mail server communicates with the processor to decode the bounced message and within the contact database is stored an indication that the electronic address datum is no longer valid.

Optionally, when an electronic address is found not valid, a tag is associated with the non-valid address data within the memory, such that no further KIT message is sent to this invalid electronic address. A mail server operator is then notified that an electronic address is no longer valid. Alternatively, a flag is stored in association therewith to cause a further KIT message to be sent to that address at a later time in order to establish that the failure was not of a temporary nature.

Numerous other embodiments may be envisaged without departing from the spirit or scope of the invention.

What is claimed is:

1. A method for managing an electronic contact database of a mail server comprising the steps of:
   providing an electronic contact database, the electronic contact database for storing at least a plurality of electronic addresses and being stored by a network file server;
   providing a recipient electronic address, the recipient electronic address being one of the plurality of electronic addresses;
   providing an electronic mail message;
   encoding a network address including a file name and the network file server within the provided electronic mail message, the file name indicative of a unique recipient associated with the recipient electronic address and indicative of the electronic contact database; and,
   transmitting the electronic mail message to the provided recipient electronic address.

2. A method according to claim 1, wherein the encoded network address includes data relating to a unique sender of the electronic mail message.

3. A method according to claim 1, wherein the step of transmitting the electronic mail message to the provided recipient electronic address comprises the steps of:
   receiving the electronic mail message on a computer host system associated with the provided recipient electronic address;
   providing at least an indication of a file corresponding to the file name; and,
   upon accessing the electronic mail message on a host computer system, automatically requesting downloading the file corresponding to the at least an file name from the network file server indicating to the server that the electronic mail message was accessed on the host computer system.

4. A method according to claim 3, wherein the file name from which to retrieve data from the network file server is other than of a valid file on the network file server.

5. A method according to claim 1, comprising the steps of:
   associating a time value to the provided electronic mail message, the time value indicative of a time the electronic mail message is provided; and
   storing the time value for allowing another provided electronic mail message.

6. A method according to claim 1, wherein the network address is unique for each electronic mail message so generated by a same server.

7. A method according to claim 1, wherein the network address is a URL.

8. A method for tracking receipt of electronic messages by a server comprising the steps of:
   providing an electronic mail message, the electronic mail message relating an electronic contact database where the electronic contact database is for storing at least a plurality of electronic addresses;
   providing data indicative of a server address, the server address for tracking of the electronic mail message;
   generating an encoded mail message from the provided electronic mail message and comprising a file name, the file name including encoded data therein indicative of a unique recipient associated with a destination electronic address, the destination electronic address being one of the plurality of electronic addresses, and indicative of the electronic contact database; and,
   providing the encoded mail message to the destination electronic address.

9. A method for tracking receipt of electronic messages by a mail server comprising the steps of:
   receiving from a host computer system a request for downloading a file, the file indicated by a file name, the request associated with a network file server storing an electronic contact database comprising at least a plurality of electronic addresses;
   decoding the file name at least in dependence upon the electronic contact database to determine therefrom recipient data;
   storing within the electronic contact database in association with the recipient data an indication that an electronic mail message transmitted thereto has been accessed; and,
   sending a data file in accordance with the request to the host computer system.

10. A method according to claim 9, wherein the data file is other than the requested file.

11. A method according to claim 10, wherein the data file is an image file.

12. A method according to claim 9, wherein the step of storing an indication that an electronic mail message transmitted thereto has been accessed comprises the step of storing the indication in association with a record relating to the recipient within the electronic contact database.

13. A method according to claim 9, wherein the step of decoding the file name to determine therefrom recipient data includes the step of:
    comparing the determined recipient data with data associated with electronic addresses stored within the electronic contact database; and,
    determining an electronic address of a sender of the accessed electronic mail message.

14. A method according to claim 9, wherein the step of storing an indication that an electronic mail message transmitted thereto has been accessed comprises the step of transmitting the indication to the sender address.

15. A method according to claim 9, wherein the network address is a URL.

16. A method according to claim 9, comprising the step of storing the file name as an encoded file name within a memory for retrieving the encoded file name when the mail server receives a request from an electronic address associated with the encoded file name for downloading the data.

17. A method according to claim 16, comprising the step of deleting the encoded file name from the memory when the mail server receives a request for downloading the file from an electronic address associated with the encoded file name to which the electronic mail message was sent.

18. A server for tracking distribution of electronic messages relating an electronic contact database comprising:
    a memory storage for storing at least a plurality of electronic addresses stored within the electronic contact database, the electronic contact database being stored on a network file server, the memory storage also for storing instruction data for performing the steps of;
        providing a recipient electronic address, the recipient electronic address being one of the plurality of electronic addresses;
        providing an electronic mail message;
        encoding a network address including a filename and the network file server within the provided electronic mail message, the filename indicative of a unique recipient and a unique sender of the electronic message, and the electronic contact database; and,
        transmitting the electronic mail message to the provided recipient electronic address; and,
    an output port in communication with the memory storage, the output port for transmitting the electronic mail message to at least one of the plurality of electronic addresses stored within the electronic contact database.

19. A server according to claim 18, comprising a clock for providing a time value indicative of a time the electronic mail message was sent.

20. A server for tracking receipt of electronic messages relating an electronic contact database comprising:
    an input port for receiving a request from a host computer system, the request for downloading a file, the file indicated by a file name, the request associated with a network file server storing the electronic contact database being stored upon a network file server;
    a memory storage for storing instruction data for performing the steps of:
        receiving from a host computer system the request for downloading data from within a file, the file indicated by the file name;
        decoding the file name to determine therefrom recipient data;
        storing within the electronic contact database in association with the recipient data an indication that an electronic mail message transmitted thereto has been accessed; and,
        sending a data file containing recipient data stored within the electronic contact database in accordance with the request to the host computer system.

* * * * *